United States Patent Office 2,732,250
Patented Jan. 24, 1956

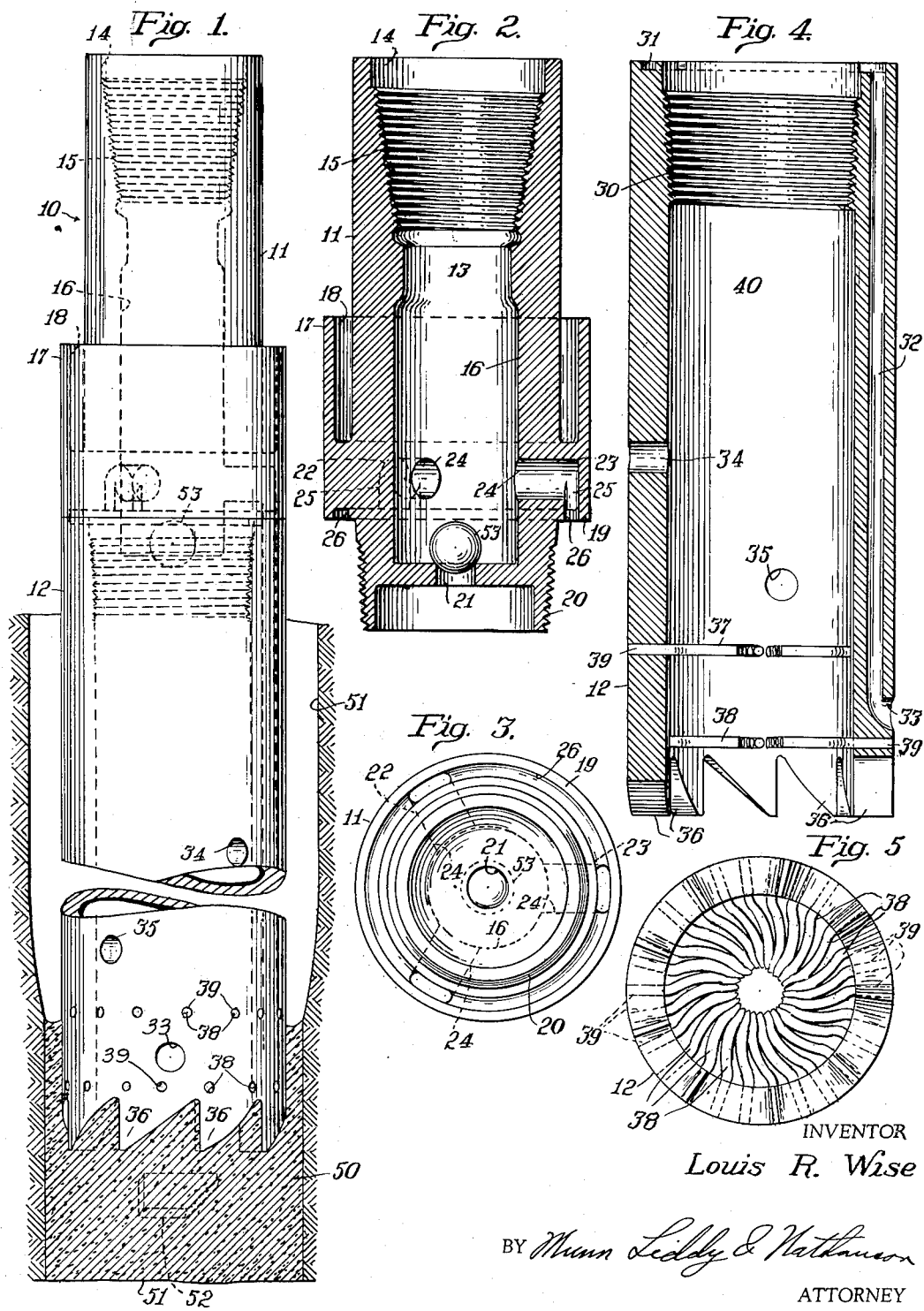

2,732,250

FISHING TOOL

Louis R. Wise, Stamford, Tex.

Application October 6, 1952, Serial No. 313,240

6 Claims. (Cl. 294—102)

This invention relates to well drilling equipment, and particularly to a fishing tool employed in removing fish, such as drill bits which have been broken off in drilling operations. The fishing tool is adapted to remove articles which would prevent further drilling, as well as to pick up articles which might have some value.

An object of this invention is to provide a fishing tool which will effectively wash down sand and mud, and which is capable of readily digging its way down to an object to be retrieved.

Another object of this invention is to provide a fishing tool with which large volumes of water may be employed in washing down to an object, and which has additional means for washing to assist in forcing an object upwardly into the fishing tool.

A further object of this invention is to provide catchers or fingers of simple construction which permit entrance of an object into the tool, but preventing withdrawal therefrom until the tool has been brought to the surface of the well.

Yet another object of this invention is to provide a two-piece fishing tool simply constructed, but having great rigidity. The two-piece tool is so devised that it can be more easily handled than a one-piece tool and the fish can be removed from the bottom of the tool with ease.

Also an object of the invention is to provide separate washing means for washing the fish into the tool without utilizing tubing exposed to damage from handling or fishing operations.

These and other objects and advantages will become apparent from the following description of the present invention illustrated in the accompanying drawing, in which:

Figure 1 is an elevational view of the two-piece tool constructed in accordance with the invention, showing the manner in which it is employed in fishing.

Figure 2 is a sectional elevational view of the upper part of the two-piece tool shown in Figure 1.

Figure 3 is a bottom view of the upper tool element of Figure 2.

Figure 4 is a sectional elevational view of the bottom member of the two-piece tool shown in Fig. 1.

Figure 5 is a bottom view of the tool element shown in Figure 4.

Similar reference characters represent similar parts in the several figures.

Frequently in drilling wells, drill bits or other portions of the drilling equipment, break off and fall to the bottom of the well. The particles or fish often effectively prevent further drilling operations, since they may quickly damage the drill or other mechanism or otherwise impair the drilling operation. It is essential that the fish be removed from the well before further drilling operations. Many kinds of fishing tools have been devised to meet the problem. In general, the tools comprise hollow chambers having associated teeth for working their way through mud or other silt which will fall over the fish and washing means for washing away the mud and silt.

The washing means is particularly useful to wash the mud and silt away from articles such as drill cones.

The tool also ordinarily comprises fingers or catchers of some kind which will permit the entrance of the fish into the tool proper, and will prevent withdrawal therefrom until the fishing tool has been brought to the surface of the well.

The following description will illustrate a fishing tool which is uniquely adapted to removing fish. The tool is simply constructed, strong enough to withstand the heavy pressures and will function with greater success than in previously known tools.

Referring now particularly to the drawing, 10 generally indicates the two-piece tool comprising an upper section 11 and a lower section 12. The upper section comprises a unitary casing or housing which may be formed as a single integral unit, or made up of fabricated elements securely joined together. The upper section has a central opening 13, including a pipe-receiving upper portion 14, a tapped portion 15 and a central chamber 16. Portions 14 and 15 are adapted to receive and retain drill pipe. The threads are those which are ordinarily employed with drill pipe, although obviously any particular threads may be used, if desired.

The upper element is further provided with a concentrically arranged upstanding cylindrical flange 17, which forms with the body a cup-like catch basin 18. This basin or catch-cup is adapted to retain small bearings or small pieces or parts of iron which would drop back down the well when the washing is discontinued, as will be hereinafter described. The upper portion is also provided with a flange 19 and a threaded lower end 20.

There are four openings leading outwardly from the central chamber 16 in the herein disclosed embodiment. The bottom opening 21 is the normal opening through which the wash water flows outwardly of the chamber 16 during the downward movement of the fishing tool. There are also provided three equally spaced openings 22, 23, around the lower end of chamber 16. Each opening leads to a passageway such as 24, and a connecting downwardly extending passageway 25. All of the passageways 25 empty into a groove or water passageway 26 concentrically arranged with respect to chamber 16.

The lower part of the two-piece tool 12 comprises a one-piece unitary shell-like structure which may be made in any convenient manner. At its upper end the tapered tapped portion 30 is provided. There is also a concentrically arranged water-receiving groove or channel 31. Channel 31 is formed similarly to channel 26 and threaded portion 30 is adapted to receive and cooperate with threads 20 on the upper part 11. It is seen that by means of the threads the upper and lower part can be securely fastened to each other. The outer diameter of the lower part 12 is equal to the outer diameter of the flange 17, whereas the upper portion of the upper part 11 is reduced in diameter from the flange 17. As shown in Fig. 1, the tool is of uniform diameter from the top of the catch-cup 18 to the bottom of the tool itself. Grooves 26 and 31 cooperate to form a fluid chamber at the junction of the upper and lower sections 11 and 12.

Three equally spaced water passageways 32 lead downwardly from groove 31 to three equally spaced outlets 33. The outlets 33 are immediately adjacent the bottom of the tool for a reason which will appear more clearly below.

The tool is also provided with one or more laterally extending openings, such as 34 and 35. These openings lead to the outside of the tool casing. The bottom of the tool is provided with milling teeth or cutters 36 which may be made integrally with the lower part of the tool or may be attached thereto in any suitable manner. The milling teeth can be hardened as desired. There is also provided two levels of equally spaced wire catchers or fingers 37 and 38. These fingers or catchers comprise cables such as ¼" wire line cables welded in equally spaced openings 39 and extending to near the center of the tool. The wire catchers are sufficiently flexible to allow the entrance of a fish upwardly into the chamber 40 under the influence of water pressure and the downward pressure of the drill pipe.

When a fishing operation is necessary the upper part of the tool is attached to a drill pipe, then the lower part of the tool is attached and the elements are threaded up tightly enough to prevent accidental disengagement. Locking devices can be utilized to prevent accidental separation of the two part tool elements. The tool is then lowered down the well by coupling more drill pipe in the customary fashion. Eventually the tool will reach the sand, mud, etc. such as 50, which is encountered at the bottom of the well 51. During the progress of the tool downwardly through the well and particularly once the mud is encountered, wash water under pressure is sent downwardly through the drill pipe through the opening 21 in the upper part of the fishing tool. The water courses downwardly through chamber 40, outwardly through the milling cutter edge and the openings between the teeth. The water then flows upwardly through the well and carries dirt and other foreign matter away from the lower edge of the fishing tool. Water is at the same time flowing through the openings 22, 23 and 24 through the channels 26 and 31, and downwardly through passageways 32. This water leaves the fishing tool through the openings 33 immediately above the milling cutters.

When a position immediately above the fish 52 is reached, a ball 53, illustrated in Figures 1 and 2, is dropped down through the drill pipe. The ball comes to rest in the bottom of chamber 16 in a position such as to close off the opening 21. The water then no longer flows into chamber 40 of the lower part of the tool. Water continues to flow downwardly through the passageways 32, however. At this time the drill pipe can be rotated so as to cause the milling teeth to cut into the mud and because of the weight of the drill pipe above the tool, the tool will sink downwardly therein as the teeth are rotated.

The downward movement of the fishing tool will also be facilitated by the water coming out of the openings 33 which will not only serve to wash mud upwardly, but will also wash the mud inwardly through the opening in the bottom of tool element 12, upwardly into the chamber 40. Eventually the cutting teeth will move below the position of the fish and the weight of the pipe and the force of the wash water will force the fish upwardly past the wire catchers 37 and 38. Openings 34 and 35 permit the exit of water, etc. from chamber 40. This prevents the buildup of excessive pressure in chamber 40 or chamber 16 during washing down. These blowout holes also provide escape for the mud and water being washed up into chamber 40 by the force of water leaving openings 33 after the ball 53 has been placed in position.

Drill cones and other elements are apt to become lodged in the side of the well. Drill cones are arranged so that if one becomes detached it tends to be driven at an angle into the side walls of the well and other objects which may be lost in the hole generally are forced outward into the side walls, or stuck in the side walls by the action of the bit as it rotates. With my invention it is possible to direct extremely high pressure jets of water in an outward and downward direction. The nozzles 33 for these jets are located immediately above the cutting teeth of the tool, but the jet of water itself cleans the well walls and is directed downward along the margin of the wall. The force of the jet removes the wall material or accumulated debris from around the fish and the action of the jet due to the fact that it is directed against a part of the fish nearest the wall, forces the fish toward the center of the hole.

After the fish has been caught the water pressure is reduced and the flow of water upwardly through the well casing ceases. When this occurs small bearings or other particles which were being washed upwardly because of the flow of water under high pressure will drop to the bottom of the well.

The cup 18 will serve to capture such small particles and thus the fishing operation is more efficiently accomplished. When the fishing tool has been withdrawn from the well, the lower element can be removed from the upper element and the fish withdrawn through the top thereof.

From the foregoing description it is seen that a fishing tool of great simplicity and ruggedness has been provided. Also it is apparent that the fishing tool will function most effectively in removing articles from wells. The tool is simply and cheaply constructed and can be placed in operation and withdrawn from operation with very little effort.

While I have shown and described a preferred form of my invention, it will be understood that variations in details of form may be made without departure from the invention as defined in the appended claims.

I claim:

1. A well fishing tool comprising an upper part and a lower part removably connected, a chamber formed in said upper part and a second chamber formed in said lower part, and a washing fluid passageway extending between both of said chambers, additional washing fluid passageways leading outwardly of the upper part chamber and in communication therewith, said additional passageways communicating with a groove concentrically arranged with respect to said chambers formed in said upper part and also constituting a fluid passageway, a second groove concentrically arranged with respect to said chambers formed in said lower part and in open communication with the first mentioned groove, and forming a fluid passageway, said second part having channels extending from the groove formed therein parallel to the chamber therein, said channels constituting wash fluid conduits and opening outwardly of said tool adjacent the lower end thereof.

2. A well fishing tool comprising an elongated body having an upper chamber and a lower chamber, a passageway extending between said chambers, spaced passageways extending outwardly of said upper chamber and downwardly parallel to said lower chamber and means forming outlets leading from said passageway laterally outwardly of said tool adjacent the lower end of the lower chamber, the lower end of the lower chamber being open, spaced rows of wire fingers affixed to said tool and extending inwardly into said lower chamber adjacent the lower end thereof, said fingers being flexible and adapted to retain material forced into said lower chamber through operation of said tool, and a flange affixed to said tool and extending upwardly generally parallel thereto in spaced relationship therewith, said flange forming with said tool a catch-cup.

3. A well fishing tool comprising an upper part and a lower part removably connected, a chamber formed in said upper part and a chamber formed in said lower part, the latter chamber being open at its lower end, spaced passageways extending laterally outwardly of said upper chamber and formed in said tool, said passageways extending downwardly through said upper part and communicating with a groove-like passageway formed in said lower part, additional passageways extending downwardly from said groove-like passageway through said lower part and opening outwardly thereof adjacent the bottom of said lower chamber, flexible fingers mounted in said body and extending inwardly of the lower chamber adjacent the lower end thereof, said fingers normally extending laterally of said lower chamber to substantially the center thereof.

4. A well fishing tool comprising an upper part and a lower part removably connected, a chamber formed in said upper part and a second chamber formed in said lower part and a washing fluid passageway extending between both of said chambers, an additional washing fluid passageway leading outwardly of the said upper part chamber and in communication with said chamber, said additional passageway communicating with a groove concentrically arranged with respect to said chambers and formed in said upper part and also constituting a fluid passageway, a second groove concentrically arranged with respect to said chambers formed in said lower part and in communication with the first mentioned groove, said grooves cooperating to form a fluid chamber, said second part having a channel extending from the groove formed therein parallel to the chamber therein, said channel constituting a washing fluid conduit and opening outwardly of said tool adjacent the lower end thereof.

5. Apparatus of claim 4 in which said lower part has an opening extending therethrough from the outer surface thereof into the chamber formed therein.

6. A well fishing tool comprising an upper part and a lower part removably connected, a chamber formed in said upper part and a second chamber formed in said lower part, said second chamber being of uniform size throughout the length of said lower part and being open at both of its ends, and a washing fluid passageway extending between both of said chambers, an additional washing fluid passageway leading outwardly of the upper part chamber and in communication therewith, said additional passageway communicating with a groove concentrically arranged with respect to said chambers and constituting a fluid passageway, a second groove concentrically arranged with respect to said chambers formed in said lower part, and in communication with the first mentioned groove, said grooves cooperating to form a fluid chamber, said second part having a channel extending from the groove formed therein and constituting a washing fluid conduit, the last named channel opening outwardly of said tool adjacent the lower end thereof.

References Cited in the file of this patent

UNITED STATES PATENTS

| | | |
|---|---|---|
| 1,178,999 | Fleming | Apr. 11, 1916 |
| 2,159,249 | Brantly | May 23, 1939 |
| 2,416,613 | Costin | Feb. 25, 1947 |
| 2,445,249 | Sproull | July 13, 1948 |
| 2,550,228 | Costin | Apr. 24, 1951 |
| 2,626,829 | Maxwell | Jan. 27, 1953 |